(No Model.)
A. DUN.
GALVANIC ELEMENT.
No. 312,339. Patented Feb. 17, 1885.
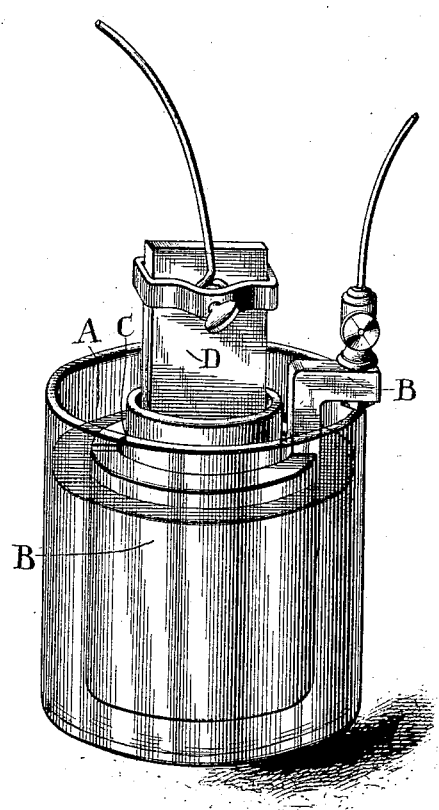

UNITED STATES PATENT OFFICE.

ALFRED DUN, OF FRANKFORT-ON-THE-MAIN, GERMANY.

GALVANIC ELEMENT.

SPECIFICATION forming part of Letters Patent No. 312,339, dated February 17, 1885.

Application filed July 26, 1884. (No model.)

*To all whom it may concern:*

Be it known that I, ALFRED DUN, a citizen of Germany, and residing at Frankfort-on-the-Main, Germany, have invented new and useful Improvements in Galvanic Elements, of which the following is a specification.

This new galvanic element is principally intended for electric-lighting purposes; but it can, however, be advantageously used where a constant current and cheap working are wanted. The element consists of two cells, and differs, essentially, from those now used in this respect—viz., that both the outer and inner cells contain the same solution as exciting-fluid, but in different degrees of strength. That in the cell for the carbon electrode is made very strong, while that in the cell for the positive electrode is weak. It has been ascertained that by the difference in the degrees of strength in one and the same solution all those conditions are fulfilled which are necessary for a very constant battery, and which up to the present it was believed could only be obtained by the use of two different solutions in the two cells. The weak solution serves as a dissolving agent for the positive electrode, while the strong solution, in combination with the carbon, acts as a depolarizer.

The invention is illustrated in the accompanying drawing, which represents a perspective view of a bicellular battery, and in which A indicates the outer cell containing the positive electrode B and the weak solution, and C represents the inner cell containing the carbon or negative electrode D and the strong solution. There are fluids which, even in a concentrated condition, have only a very weak depolarizing effect—as, for instance, sulphuric acid; yet by the use of such liquids it is possible to obtain the required depolarizing effect by the use of a larger surface in the carbon electrode, so that its surface be increased exactly in the inverse proportion to the depolarizing capability of the fluid in the carbon-cell, in order to obtain complete depolarization and a greater constancy of the element. The great advantage to be obtained by the use of a similar solution for both cells of the element is that in the working of the element the resulting product is pure, not being contaminated by the liquid from the other cell. This pure product can be used either directly for various industrial purposes or by simple reactions converted into a useful marketable product.

While the exhausted exciting-liquid in the batteries heretofore used has been quite worthless, (being only separable by costly and unprofitable methods,) from the exhausted exciting-liquid of the present element, which has not been contaminated by any heterogeneous bodies, a product is obtainable, either directly or by some simple and cheap method, the market value of which in most cases covers the cost of maintenance of the element. A further economical advantage is that the exhausted contents of the carbon-cells can, after being diluted by the addition of water, be employed for filling the cell of the positive electrode, so that it is only necessary to supply fresh exciting-liquid to the carbon-cells. By the use of similar solutions in both cells of the element a more constant current is obtained, as the two similar solutions cannot act on each other chemically, behaving in this respect very indifferently toward each other. On this account no local action—which on the one hand would cause a counter-current and on the other hand would increase the resistance of the element—takes place. The interchange between the charges of the two cells consists only in this, that they continually tend to equalize their strength, which does not, however, give rise to any counter-current nor increase the resistance of the element. In the new element there can be used advantageously as exciting-liquid in the first case such solutions as have in a concentrated condition great depolarizing-power, which effect the whole depolarization chemically without necessitating the mechanical expedient of increased carbon surface. It is preferred to use iron as the positive electrode, and as exciting-liquid nitromuriatic acid, (*aqua regis*,) the mixture consisting of muriatic and nitric acids. The nitromuriatic acid, as explained above, serves for filling both cells. For the carbon-cells it is used strong or very slightly diluted, but for the other cells very diluted, (about one-twentieth, or at the most one-tenth.) The element containing in one cell carbon and concentrated nitro-muriatic acid and in the other cell iron and dilute nitro muriatic acid remains constant for at least twenty hours when employed for electric incandescent lighting. After this period a mixture is formed in the positive-electrode cells which apparently consists of perchloride and protochloride of iron, and also contains undecomposed liquids. By heating this mixture after being removed from the cells a marketable perchloride of iron is obtained. The solution in the carbon-cells, weakened partly by diffusion and partly by the work of depolarization, serves again, when diluted, for the preparation of the positive-electrode cells, the carbon-cell being filled with fresh concentrated solution.

Nitric acid in the above proportions and degrees of strength may be employed instead of nitro-muriatic acid. Nitrate of iron is in this case formed, which is a useful commercial product.

When nitric acid is employed, zinc can be used with advantage, instead of iron, as positive electrode. From this is obtained nitrate of zinc, which, if not used as such, can be converted by ammonia or carbonates of the alkalies into oxide of zinc or carbonate of zinc and the corresponding nitrates.

Instead of carbon, an electrode of platinum or any other similar conductor can be used.

Having thus described my invention and the manner of employing the same, I claim—

A galvanic element consisting of two cells containing, respectively, the positive and negative electrodes, and in which the same exciting-liquid is in both cells, but in solution having different degrees of concentration, substantially as herein described.

In testimony whereof I have signed my name to this specification in the presence of two subscribing witnesses.

ALFRED DUN.

Witnesses:
FRANZ HASSLACHER,
JOSEPH PATRICK.